March 16, 1965 N. LEE 3,173,667
YIELDING ANCHORAGE SUPPORTING OR SHOCK-ABSORBING APPARATUS
Filed Dec. 3, 1962 2 Sheets-Sheet 1

INVENTOR
NORMAN LEE

BY
Watson, Cole, Grindle & Watson
ATTORNEYS

March 16, 1965                N. LEE                3,173,667
YIELDING ANCHORAGE SUPPORTING OR SHOCK-ABSORBING APPARATUS
Filed Dec. 3, 1962                          2 Sheets-Sheet 2

INVENTOR
NORMAN LEE

United States Patent Office 3,173,667
Patented Mar. 16, 1965

3,173,667
YIELDING ANCHORAGE SUPPORTING OR
SHOCK-ABSORBING APPARATUS
Norman Lee, Allesley, Coventry, England, assignor to
Keelavite Hydraulics Limited, Coventry, England, a
company of Great Britain
Filed Dec. 3, 1962, Ser. No. 241,953
Claims priority, application Great Britain, Dec. 5, 1961,
43,557/61
1 Claim. (Cl. 267—1)

This invention relates to yielding anchorage, supporting or shock-absorbing apparatus of the kind which absorbs or dissipates energy when relative movement between two parts of the apparatus occurs due to relative movement between the members connected by the anchorage or supporting apparatus or to a shock load being transmitted to one of such parts.

It is an object of the invention to provide an improved form of apparatus of the kind referred to which will be particularly, but not exclusively suitable for use in applications where the apparatus may be called upon to deal with vibratory forces or a series of shock loads having any one of a large range of frequencies and/or intensities.

It will be understood that when used as a yielding anchorage apparatus one of the two parts of the apparatus would be connected to one of the two members to be connected by the anchorage and the other part would be connected to the other of such members, while when used as a supporting apparatus one of the two parts would be connected to the supporting member or structure and the other connected to the device or apparatus to be supported. When used as a shock-absorbing apparatus one of the two parts would be connected to a supporting structure or member and the other of the two parts would be arranged to receive the shock loads to be absorbed.

Figure 1:
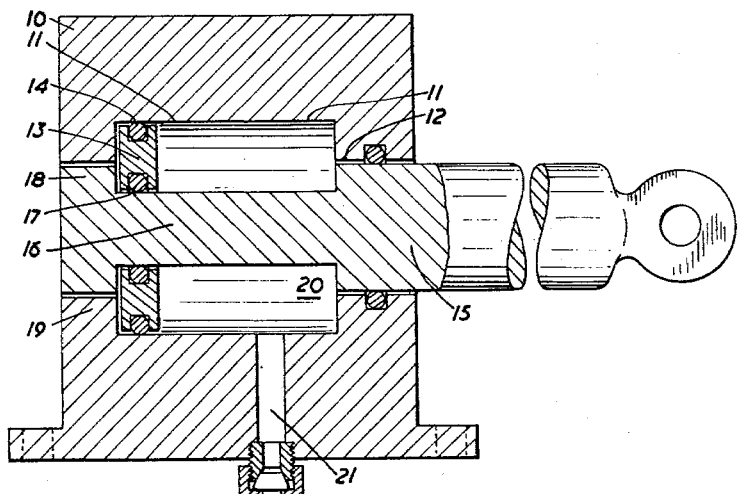
Figure 1:
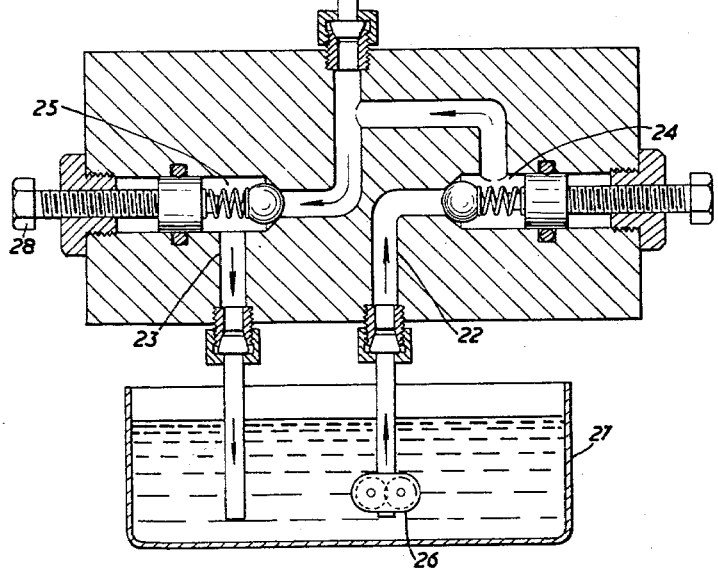
Figure 2:
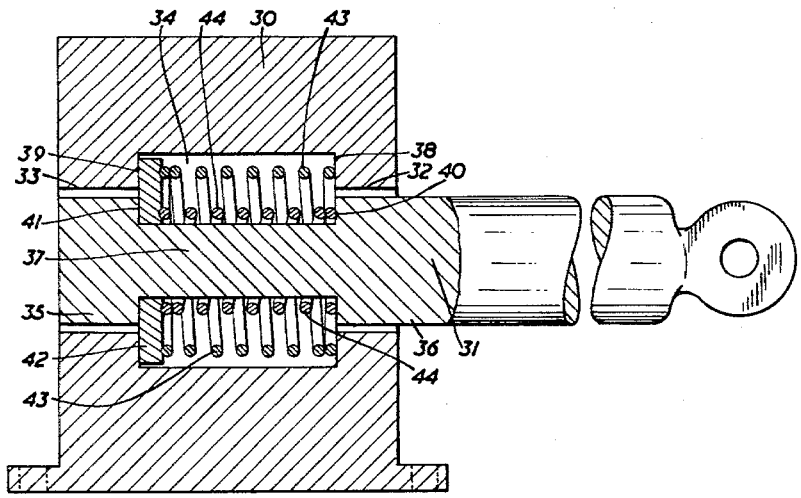

The invention may be performed in various ways and two specific embodiments will now be described by way of example with reference to the accompanying drawings in which:

FIGURE 1 is a diagrammatic sectional side elevation of a hydraulic type of vibration damper, and FIGURE 2 is a sectional side elevation through a spring type of vibration damper.

In FIGURE 1 the apparatus comprises a first part 10 formed to provide a main cylinder 11 of relatively large diameter one end of which communicates directly with a second cylinder 12 of smaller diameter coaxial with the main cylinder. Arranged for reciprocation within the main cylinder is an annular piston member 13 the outer circumference of which makes a substantially fluid-tight seal with the wall of the main cylinder by means of an O-ring seal 14 disposed in a groove in the circumferential surface of the annular piston. The bore of the annular piston is of smaller diameter than that of the second cylinder 12. Extending through the second cylinder is a second piston member 15, part of which normally lies within the main cylinder 11 and is reduced in diameter to form a rod part 16 which extends in a slidable but fluid-tight manner through the bore of the annular piston 13. The fluid-tight seal between the rod part and the bore of the annular piston is effected by means of an O-ring seal 17 disposed in a circumferential groove in such bore.

The rod part 16, where it projects beyond the end of the bore of the annular piston, is provided with a head 18 of enlarged diameter forming a stop to limit movement of the annular piston along the rod part in the direction away from the second cylinder 12. The end of the main cylinder adjacent to this stop is open but has an internal circumferential flange 19 constituting a stop limiting the movement of the annular piston in the direction away from the second cylinder.

Communicating with the space 20 (herein called the working chamber) within the main cylinder between the annular piston and the second cylinder is a liquid entry and exit passage 21 leading to supply the outlet passages 22, 23 containing spring pressed non-return valves 24, 25 such as to permit flow into the exit and entry passage 21 through the supply passage only and flow out of the exit and entry passage through the outlet passage only. The supply passage is connected to a source of liquid under pressure, such as oil pump 26 in a reservoir 27, while the non-return valve 25 in the outlet passage is formed and arranged so that, when flow through takes place, an appreciable amount of energy is absorbed or dissipated. The valve is provided with adjusting means 28 provided enabling the resistance to flow through the outlet passage, and hence the energy absorbed for given conditions of operation, to be varied.

It will be seen that, with the apparatus above described the liquid pressure maintained in the working chamber 20 will tend always to maintain the main annular piston 13 in contact with the stop constituted by the internal flange 19 at the end of the main cylinder remote from the second cylinder 12, and to maintain the second piston 15 in the position in which the stop 18 on its rod part 16 bears on the annular piston. Further, on any movement of the second piston in either direction relatively to the main cylinder from this normal position, liquid will be expelled from the working chamber through the outlet passage 23 due, for one direction of movement, to movement of the second piston relatively to (i.e. towards) the annular piston and, for the other direction of movement, to simultaneous movement of the annular piston and second piston in the same direction so that the expulsion occurs due to the different effective areas of these two pistons.

In the construction illustrated in FIGURE 2, the apparatus comprises an outer part 30 having formed therein a bore within which is mounted to reciprocate freely an inner part 31, the bore of the outer part having end portions 32, 33, of relatively small diameter and an intermediate portion 34 of relatively large diameter, while the inner part 31 has portions 35, 36 which are arranged to slide freely but with sliding fit in the portions 33, 32 of the bore of the outer part, and an intermediate part 37 of smaller diameter than the end portions and of approximately the same length as the large-diameter portion 34 of the bore of the outer part. Thus there are internal shoulders 38, 39 constituting abutments formed at the ends of the large diameter intermediate portion 34 of the bore of the outer part at its junctions with the smaller-diameter end portions of such bore, while there are shoulders 40, 41 constituting abutments at the ends of the small-diameter intermediate portion 37 of the inner part. Arranged to move axially relatively to the inner and outer parts in the space between the large-diameter portion of the bore of the outer part and the small-diameter portion of the inner part is a force-transferring member 42 of annular disc-like form. Interposed between the abutment shoulder 38 and the adjacent face of the annular force-transferring member 42 is a compression spring 43 which thus applies continuously to the annular force-transferring member a force tending to maintain it in engagement with the abutment shoulder 39 at the other end of the large-diameter portion of the bore of the outer part. A second compression spring 44 is interposed between the same face of the annular force-transferring member 42 and that abutment shoulder 40 on the inner part which lies adjacent to the abutment shoulder 38 on the outer part against which the first spring bears directly. One of the compression springs, therefore, tends to maintain one face of the annular force-transferring member in engagement with the abutment shoulder at one end of the large-diameter portion of the bore of the outer part while the other spring tends to maintain the adjacent abutment shoulder on the inner part in engagement with the same face of the annular force-transferring member. It will be apparent that the springs will thus normally tend to maintain the inner and outer parts in a predetermined relative axial position in which the force-transferring member is pressed by the springs into contact with the two abutment shoulders 39 and 41 respectively on the inner and outer parts, which lie at one end of the annular space in which the springs lie. If sufficient axial force is imposed on the inner part 31 towards the left the spring 44 will be compressed while the smaller-diameter portion of the inner part 31 slides through the member 42, the spring 43 being unaffected. If a sufficient force is exerted on the inner part 31 in the right hand direction the spring 43 will be compressed by bodily movement of the inner part 31 and the member 42 towards the abutment 38 and the spring 44 will be unaffected.

What I claim as my invention and desire to secure by Letters Patent is:

A yielding anchorage, supporting or shock absorbing apparatus comprising co-axial main and subsidiary cylinders which communicate with one another at their adjacent ends and of which the main cylinder is of larger diameter than the subsidiary cylinder, a main annular piston device arranged for reciprocation within the main cylinder with its outer circumference making a substantially fluid tight seal with the wall of the main cylinder to provide therewith a pressure chamber, a second piston device arranged for reciprocation within the subsidiary cylinder with which it makes a substantially fluid tight seal and to be subject to the pressure in said pressure chamber, a stop limiting movement of said main piston device in a direction away from said subsidiary cylinder, a rod part rigid with said second piston device, said rod part being of smaller diameter than said second piston device and extending through the bore of said annular first piston device and making a fluid tight seal therewith and having an abutment thereon limiting the movement of said first piston device relatively to said rod part in a direction away from said second piston device, and hydraulic apparatus comprising delivery and escape passages communicating with said pressure chamber, valves in said delivery and escape passages to permit flow therethrough respectively to and from said pressure chamber while imposing resistance on said flow and means for supplying liquid under pressure to said delivery passage at a point on the side of the control valve therein remote from said pressure chamber.

References Cited by the Examiner
UNITED STATES PATENTS

| | | |
|---|---|---|
| 1,828,383 | 10/31 | Andersen. |
| 2,372,214 | 3/45 | Loepsinger _____ 267—1 |
| 2,575,982 | 11/51 | Stevens _____ 267—1 |
| 2,734,740 | 2/56 | Morris _____ 267—64 X |
| 2,899,194 | 8/59 | Zumwalt _____ 267—64 X |
| 2,945,677 | 7/60 | Kammerer _____ 267—1 X |
| 3,012,770 | 12/61 | Kendall _____ 267—64 |
| 3,091,449 | 5/63 | Boutefoy _____ 267—1 X |

ARTHUR L. LA POINT, *Primary Examiner.*
MILTON KAUFMAN, *Examiner.*